United States Patent
Kubota et al.

(10) Patent No.: US 8,797,000 B2
(45) Date of Patent: Aug. 5, 2014

(54) CHARGING CONTROL SYSTEM

(75) Inventors: Osamu Kubota, Tokai (JP); Akihide Tanaka, Hitachinaka (JP); Xiaoliang Feng, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 403 days.

(21) Appl. No.: 13/160,930

(22) Filed: Jun. 15, 2011

(65) Prior Publication Data

US 2011/0309801 A1 Dec. 22, 2011

(30) Foreign Application Priority Data

Jun. 16, 2010 (JP) ................. 2010-136890

(51) Int. Cl.
*H02J 7/04* (2006.01)
*H02J 7/00* (2006.01)

(52) U.S. Cl.
USPC ............ 320/162; 320/128; 320/134; 320/116

(58) Field of Classification Search
USPC .................... 320/162, 128, 134, 116
See application file for complete search history.

(56) References Cited

U.S. PATENT DOCUMENTS

| | | | |
|---|---|---|---|
| 5,617,011 A * | 4/1997 | Hammer et al. ............. | 322/28 |
| 5,939,861 A | 8/1999 | Joko et al. | |
| 6,278,052 B1 * | 8/2001 | Takehara et al. ............. | 136/244 |
| 6,492,792 B1 * | 12/2002 | Johnson et al. ............. | 320/136 |
| 6,545,211 B1 * | 4/2003 | Mimura ............. | 136/244 |
| 6,969,974 B1 * | 11/2005 | Liu ............. | 320/132 |
| 7,693,671 B2 * | 4/2010 | Okumura et al. ............. | 702/63 |
| 2004/0155661 A1 | 8/2004 | Field et al. | |
| 2006/0091854 A1 * | 5/2006 | Chen et al. ............. | 320/116 |

FOREIGN PATENT DOCUMENTS

| | | |
|---|---|---|
| JP | 04-328278 | 11/1992 |
| JP | 08-182209 | 7/1996 |
| JP | 09-106835 | 4/1997 |
| JP | 2000-125477 | 4/2000 |
| JP | 2003-059539 | 2/2003 |
| JP | 2003-284237 | 10/2003 |
| JP | 2005-158627 | 6/2005 |
| JP | 2006-300561 | 11/2006 |
| JP | 2009-026674 | 2/2009 |

(Continued)

OTHER PUBLICATIONS

Extended European Search Report in EP11170021.7, dated Oct. 13, 2011. [4 pgs.].

(Continued)

*Primary Examiner* — M'Baye Diao
(74) *Attorney, Agent, or Firm* — Antonelli, Terry, Stout & Kraus, LLP.

(57) ABSTRACT

In a charging control system for recording data regarding charging a secondary battery, a status recording unit refers the charging voltage value and the charging current value and records the referred charging voltage, the referred charging current and reference time when the charging current value is referred and time when the charging voltage value is referred, on the recording unit. A battery protecting unit stops the charging the secondary battery when the charging voltage exceeds the predetermined target voltage value. The status recording unit starts recording of the charging voltage value, the charging current value, and the reference time on the recording unit, when the charging voltage exceeds the target voltage value as a result of a fail in stopping the charging by the battery protecting unit because of occurrence of a trouble in the battery protecting unit.

5 Claims, 2 Drawing Sheets

(56) References Cited

FOREIGN PATENT DOCUMENTS

| JP | 2009-043485 | 2/2009 |
| JP | 2009-072039 | 4/2009 |
| JP | 2009-236629 | 10/2009 |

OTHER PUBLICATIONS

Office Action in Japanese Patent Application No. 2010-136890, dated Jul. 30, 2013 (in Japanese, 2 pgs); [partial English language translation, 2 pgs).

* cited by examiner

CHARGING CONTROL SYSTEM

CROSS REFERENCE TO RELATED APPLICATION

This application claims the foreign priority benefit under Title 35, United States Code, §119(a)-(d) of Japanese Patent Application No. 2010-136890, filed on Jun. 16, 2010 in the Japan Patent Office, the disclosure of which is herein incorporated by reference in its entirety.

BACKGROUND OF THE INVENTION

1. Field of the Invention

The present invention relates to a charging control system.

2. Description of the Related Art

Lithium ion secondary batteries (hereinafter simply referred to also as a battery) are secondary batteries using absorbing and storing lithium ions in charging and discharging reactions. The lithium ion secondary battery generates electricity with a higher energy density than a lead battery and a nickel-cadmium battery. In addition, there were few cases where lithium ions, which usually contribute to the charging and discharging reactions in normal uses, precipitate lithium as a single substance on an electrode within the battery. Accordingly, the lithium ion secondary battery has a low possibility of deactivation as a result of drop of lithium from the electrode in the battery as a single substance and a superior repeatability in discharging capacity after repeated charging and discharging cycles, so that a stable cycling characteristic is provided. For these reasons, the lithium ion secondary battery is much expected to have uses, for example, cellular phones, portable electronic devices power sources, emergency auxiliary power sources, power sources for mobile bodies such as a train, a ship, an automobile vehicle, and a two-wheel vehicle, and a power gird such as a smart grid.

However, when the lithium ion secondary battery is overcharged, the battery may be deteriorated, generate heat, ignite, and break, etc. To prevent these troubles, the lithium ion secondary battery is generally provided with a counter measure against the overcharge. The countermeasures are largely divided into two kinds of technologies. One is a technology of previously preventing the overcharging itself. The other is a technology of treating the overcharged secondary battery. There are some types of overcharging protecting technologies such as a potential detecting type, a heat detecting type, and an internal pressure detection type.

As the technology of previously preventing the overcharging itself, JP 9-106835 A discloses a potential detecting type of overcharging protecting technology of making the non-aqueous electrolyte to contain an aromatic compound that polymerizes under a voltage not smaller than the maximum operation voltage previously set. In this technology, the aromatic compound is electrochemically polymerized under the voltage during overcharging, which increases the internal resistance of the battery to suppress the overcharging in the battery. In addition JP 4026587 discloses a technology of making a positive electrode to contain particles such as Cu and Ag. In this technology, these particles solve out from the positive electrode during overcharging and precipitate at the negative electrode in dendrite state to pass through a separator to accelerate minute short-circuiting between the positive and negative electrodes to immediately stop the overcharging.

On the other hand, as the technology of treating overcharged battery, there are two types of overcharging counter technologies, i.e., a heat detection type and an internal pressure detection type. As the heat detection type of overcharging counter measure technology, JP 2009-43485 discloses a technology of utilizing a shutdown function which is inherent to the separator. The separator is generally formed with a porous film serving to prevent short-circuit between the positive and negative electrodes. However, there may be a case where a temperature of the battery extremely increases by for example, an external short-circuiting, and a trouble in charging voltage control function of the battery. In such a case, the separator softens with increase in a temperature of the battery, so that the separator substantially becomes imperforate and does not allow a current to flow, which provides a so-called shut down function. In this technology, the shut down function of the separator can stop the temperature increase of the battery from tens over a hundred degrees to about two hundred degrees and prevent an overcharge current from flowing at a current value not less than the present value. JP 2009-26674 discloses a technology of suppressing progressed overcharging which makes the nonaqueous electrolyte to contain the thermal expansion capsules which expands when the battery temperature increases. When the battery temperature increases due to the overcharging, the thermal expansion capsules expand, which forms spaces where the nonaqueous electrolyte does not exist, so that movement of lithium ions is physically stopped to prevent the progressed overcharging from further progressing.

As the internal pressure detection type of overcharging counter measure technology, JP 2003-59539 discloses an internal pressure releasing mechanism provided in a battery container. In the lithium ion battery using the nonaqueous electrolyte, during a battery trouble such as the overcharging, there may be a case where a large current charging or discharging states may be kept. In such a case, the nonaqueous electrolyte reacts with the active materials of the positive and negative electrodes, which suddenly generates a large quantity of gas within the battery container, so that the internal pressure suddenly increases, and the container may suddenly burst. Accordingly, an internal pressure release mechanism for releasing the internal pressure when the pressure in the battery becomes a predetermined pressure is installed to release the internal pressure at a pressure lower than a burst pressure of the battery. In addition JP 3010781 discloses a technology of releasing a pressure releasing valve before the battery bursts or ignites with a cracked gas generated by decomposition of an addition agent contained in an electrode at a relative low voltage in an initial overcharge stage.

However, for example, in technologies of making additional agents be contained in the electrodes or the nonaqueous electrolytes, materials usable as active material made be contained in the electrodes and components made be contained in the nonaqueous electrolytes may be limited in kind or an ionic conductivity of the nonaqueous electrolytes may be lowered. In addition, for example, in the technology of installing the pressure releasing valve in the battery, an internal structure of the battery becomes complicated or a battery specific capacity may decrease. In other words, to apply the aforementioned technologies, the battery characteristics may be degraded to increase safety of the battery against overcharging.

Accordingly, a technology of applying an overcharging counter measure to a circuit connected to the battery without applying the overcharging counter measure to the inside of the battery is known. JP 2009-72039 discloses that a controller in a low voltage charging circuit measure a voltage battery, and when the battery voltage reaches a forcibly discharging start voltage previously set, a forcible discharging unit forcibly discharge the battery until the battery voltage reach a forcible discharging finish voltage. In addition, JP 2003-284237 discloses that a low voltage diode is connected in series with the battery and when the battery voltage becomes the overcharging voltage, a thermal fuse thermally coupled the low voltage diode is disconnected because a current flowing through the low voltage diode suddenly increases.

SUMMARY OF THE INVENTION

An aspect of the present invention provides a charging control system capable of measuring a charging current and a charging voltage during overcharging for recording.

The present invention can provide a charging control system capable of objectively grasping the extent of overcharging the battery without the complicated configuration in the battery.

An aspect of the present invention provides a charging control system for recording data regarding charging a secondary battery, comprising:

a recording unit configured to store the data;

a voltage measuring unit configured to measure a charging voltage value of the secondary battery;

a current measuring unit configured to measure a charging current value of the secondary battery;

a status recording unit configured to refer the charging voltage value and the charging current value and record the referred charging voltage value, the referred charging current value and reference time when the charging voltage value is referred and when the charging current value is referred, on the recording unit; and a battery protecting unit configured to stop the charging the secondary battery when the charging voltage exceeds the predetermined target voltage value, wherein the status recording unit starts recording of the charging voltage value, the charging current value, and the reference time on the recording unit, when the charging voltage exceeds the target voltage value as a result of a fail in stopping the charging by the battery protecting unit because of occurrence of a trouble in the battery protecting unit.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing an embodiment of the present invention, the above-mentioned related art will be further argued.

Generally batteries are expensive because various technologies should be applied to secure a high power generation with safeness and high reliability. In other words, when it should be determined to replace a battery with a new one because of deterioration due to influence from overcharging or the like, it is desirable to keep the old battery being used without replacing with new one as possible as the circumstance allows as far as an extend of the deterioration is low. More specifically, it is desirable that the extent of deterioration by overcharging is estimated and the replacement with a new battery is determined on the basis of the estimation result. This may be realized by as follows:

For example, an operator such a user or a manager of the battery obtains data such as an extent of overcharging the battery and a history with quantitative indexes and determines on the basis of the data whether the replacement of the battery is needed. This method provides a preferable replacement of the battery without useless replacement from viewpoint of earth resource conservation.

However, the aforementioned prior art technologies cannot grasp the extent and history of overcharging of the battery with a quantitative index, so that it is difficult to objectively determine the necessity of replacement. The present invention has been developed to provide a charging control system capable of providing for example data of the extent of overcharging the battery as objective data to an operator without complicated configuration in the battery.

Will be described an embodiment of the present invention. However, the present invention is not limited to the disclosed embodiments, but may be modified without departure from the subject of the invention.

<1. Configuration of Charging Control System of Embodiments>

Figure 1:
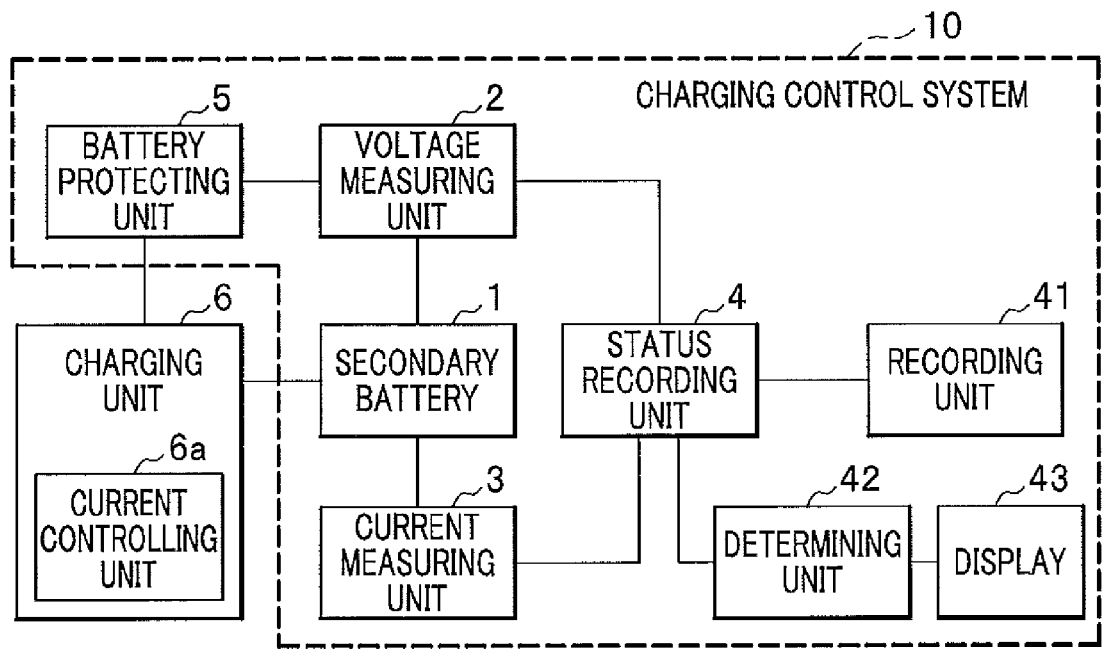
FIG. 1 is a block diagram of a main part, including a secondary battery, of a charging control system according to an embodiment of the present invention.

FIG. 1 is a block diagram for schematically showing a main part of the charging control system including the secondary battery 1. The charging control system 10 according to the embodiment includes a recording unit 41 on which data regarding charging in the secondary battery 1 is recorded (for storing the data); a voltage measuring unit 2 for measuring a charging voltage value of the secondary battery 1; and a current measuring unit 3 for measuring a charging current value for the secondary battery 1. The charging control system 10 further includes a status recording unit 4 for referring the charging voltage value and the charging current value and recording the referred charging voltage and the referred charging current, and time when the charging voltage value and the charging current value are referred as the recorded charging voltage value, the recorded charging current value, and recorded referenced time respectively, and a battery protecting unit 5 for stop charging the battery when the charging voltage value exceeds a target voltage value at least. In FIG. 1, a charging unit 6 is also shown as a part used in the charging control system 10 according to the present embodiment.

The secondary battery 1 is a unit for storing electricity supplied from the charging unit 6 (charging the battery with the electricity from the charring unit 6) and discharging the electricity toward an external load from the battery 1. The secondary battery 1 is connected to the charging unit 6. The secondary battery 1 comprises, for example, a lithium ion secondary battery. In this embodiment, the lithium ion secondary battery is used. The secondary battery 1 may be formed with one battery or a plurality of batteries. In a case where the secondary battery is formed with a plurality of batteries, the kinds of the batteries may be the same or all or a part of the batteries may be of different kinds. In the case where the secondary battery 1 is formed with a plurality of batteries, the charging control system according to the embodiment may be applied to respective batteries forming the secondary battery 1 or the batteries as one battery group.

The voltage measuring unit 2 is a unit for measuring the charging voltage value of the secondary battery 1 (a voltage between terminals of the secondary battery 2 in a closed circuit formed with the secondary battery 1 and the charging unit 6). The voltage measuring unit 2 is connected to the status recording unit 4 which refers (reads out) the measured charging voltage value. A method of measuring the charging voltage value is not specifically limited, and the charging voltage value can be measured by a known arbitrary measuring method. Timing of measuring the charging voltage value is arbitrary, and can be measured whenever a predetermined time elapsed, or in continuous measurement. From view point of a higher accuracy in charging control, the continuous measurement is preferable.

In the charging control system 10 according to the embodiment, the voltage measuring unit 2 is also connected to the battery protecting unit 5. The battery protecting unit 5 will be described later.

The current measuring unit 3 measures the charging current value of the secondary battery 1, i.e., a current quantity supplied to the secondary battery 1. The current measuring unit 3 is connected to the status recording unit 4. The measured charging current value is referred by the status recording unit 4. A method of measuring the current is not specifically limited, but the current can be measured by known optional measuring method. Timing of measuring the charging current value is arbitrary, and thus the charging current value may be measured whenever a predetermined time interval elapsed, or continuously. In order to provide the charging control with a higher accuracy, it is preferable to measure the charging current value continuously. When the charging current value is measured at every predetermined time interval, it is preferable to measure the charging current value at the same timing as timing when the voltage measuring unit 2 measures the charging voltage.

Will be described an object to measure the charging current value in the charging control system 10 according to the embodiment. The inventors discovered that generations of heat and gases during overcharging are derived from oxygen release on the basis of decomposition of a positive electrode and a nonaqueous electrolyte and a structural variation of the positive electrode through analysis of a voltage profile (history of voltage) during the overcharging, the structure and composition of the electrodes before and after the overcharging, and composition or the like of the nonaqueous electrolyte. In addition, the inventors discovered a correlation between the decomposition and the structural variation and a quantity of the charging current flowing between the positive and negative electrodes in such a status that a target voltage value is kept. In other words, the inventors discovered that an extent and history of the overcharging can be referred or managed by a third party such as the user of the battery and a battery manager through observation of the quantity of the charging current in the overcharging status and reached the invention.

The status recording unit 4 refers (reads out) the charging voltage values measured by the voltage measuring unit 2 and the charging current value measured by the current measuring unit 3. In addition, the status recording unit 4 records the referred charging data on the recording unit 41 as recorded charging data at predetermined timing (mentioned later).

It is preferable that the status recording unit 4 in the charging control system 10 according to the embodiment has a clock therein. The clock is one capable of measuring an elapsed time after start of the charging operation of the secondary battery 1, and thus, for example, a stopwatch or the like is available. In addition, the clock may be installed outside the status recording unit 4. When the charging control system 10 according to the embodiment does not have the clock, instead of this, the status recording unit 4 may be configured to periodically refer the charging data with a program defining the periodical interval for periodically referring the charging data.

Timing when the status recording unit 4 refers the charging voltage value and the charging current value is arbitrary. However, in the case that the measurement of the charging voltage value by the voltage measuring unit 2 and the measurement by the charging current by the current measuring unit 3 are done continuously, it is preferable to refer the measured values at every predetermined interval. In addition, when the measurement of the charging voltage value by the voltage measuring unit 2 and the measurement by the charging current by the current measuring unit 3 are done at every predetermined interval, it is preferable that referring the measured values is made at the same time as the measurements.

Particularly, in the charging control system 10 according to the embodiment, it is preferable that the charging voltage value and the charging current value are continuously measured, and the status recording unit 4 refers the charging voltage value and the charging current value at every predetermined time interval. Referring the measured values at every predetermined value as described above prevents a quantity of the charging data to be recorded in the recoding unit 41 from becoming extremely large. When the charging voltage value referred by the status recording unit 4 is greater than the target voltage value, the status recording unit 4 starts recording the charging data on the recording unit 41.

The "target voltage value" is not generally determined because the "target voltage value" is determined by, for example, components of the nonaqueous electrolyte, a stability of positive electrode active materials generally contained in the battery (for example, materials on the basis of a potential window), and a utilization factor. However, for example, when a mixed solution of ethylene carbonate, ethylmethyl carbonate, and dimethyl carbonate is used, the "target voltage value" is about 5 V per a battery. In addition, when $LiFePO_4$ is used as the positive electrode active material, preferably, the "target voltage value" is 4.2 V per a battery.

The recording unit 41 is a unit in which the charging data is recorded. The recording unit 41 is not specifically limited in configuration as far as the recording unit 41 has a configuration capable of recording the data. For example, a floppy (registered trademark) disk (FD), a magnetic recording medium in a hard disk derive (HDD); a semiconductor medium such as a random access memory (RAM), and a flash memory (for example, USB memory), a photo recording medium such as a compact disc (DVD-R, DVD+R, DVD+RW, DVD-RW, DVD-RAM), HD-DVD, Blu-ray disc are available. Particularly, as the recording unit 41, a detachable recording unit such as the USB memory is preferable. When the recording unit 41 is configured to be detachable from the charging control system 10 or the status recording unit 4, for example, a USB (Universal Serial Bus) memory is used as the recording unit 41, after the USB is attached to a personal computer (PC) or the like, the charging information recorded in the USB memory can be referred with the personal computer. The recording unit 41 may be one or more. For example, when two recording units 41 are provided and an automatic back up operation is executed for each other, the recorded charging information can be read out from the other recording unit 41 though one recording unit 41 is subject to a physical damage.

In addition a format of the charging data recorded on the recording unit 41 is not specifically limited. For example, the referred charging voltage value and the charging current values can be recorded together with referred time in a format of a table with arrangement made in time base. However, to provide more detailed analysis it is preferable to record the charging data in such manner that a third party can read the charging information.

The battery protecting unit 5 is connected to the voltage measuring unit 2 and the charging unit 6 and causes the charging unit 6 to forcibly stop supplying the charging current to the secondary battery 1 when the charging voltage value exceeds the target voltage value with reference to the charging voltage measured by the voltage measuring unit 2. The battery protecting unit 5 is not specifically limited in configuration and any charging unit is available as far as the charging unit has the battery protection function as described above. Only one battery protection unit 5 may be provided in the charging control system 10, and more than one battery protection unit 5 may be provided in combination with each other. However, to safely charge the secondary battery 1 it is preferable to provide more than one battery protecting units 5.

The secondary battery 1 used in the charging control system 10 according to the embodiment is charged by the charging unit 6 shown in FIG. 1. The charging unit 6 has no specific limitation in kind, but it is preferable to select one capable of a charging operation provided in consideration of a characteristic of the secondary battery 1. For example, in the charging control system 10 according to the embodiment, because the lithium ion secondary battery is used as the secondary battery 1, preferably, the charging unit 6 has a so-called constant current-constant voltage charging (CC-CV charging) to charge the secondary battery 1 through adjusting the charging current with reference to the charging voltage value with a current controlling unit 6a therein to change the charging current arbitrary. More specifically, it is preferable to charge the secondary battery 1 with the charging current of which magnitude is decreased from a constant current charging status as the charging voltage reaches the target voltage value. In the description below will be made with assuming that the current controlling unit 6a is provided in the charging unit used in the charging control system 10 according to the embodiment.

In addition, the charging unit 6 is connected to the battery protecting unit 5. Accordingly, for example, when the current control unit 6a in the charging unit 6 does not correctly function and thus the current control unit 6a cannot stop supplying the charging current to the secondary battery 1, the battery protecting unit 5 can forcibly stop supplying the charging current to the secondary battery 1.

<2. Charging Control Method in Charging Control System According to Embodiment>

Figure 2A:
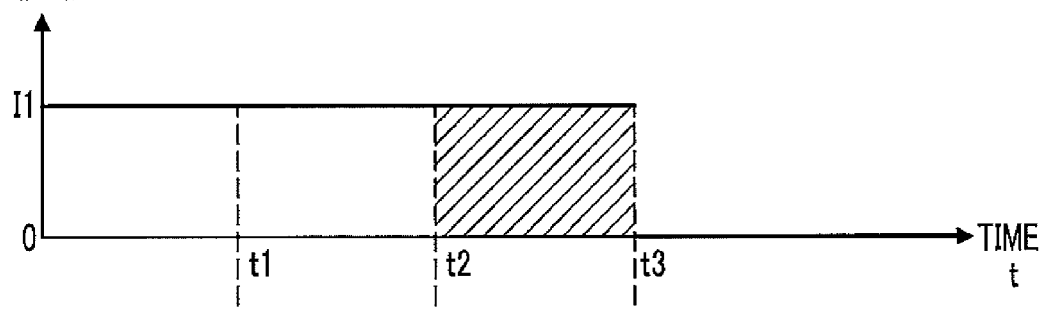
FIG. 2A is a chart showing variation of a charging current after start of charging according to the embodiment of the present invention.
Figure 2B:
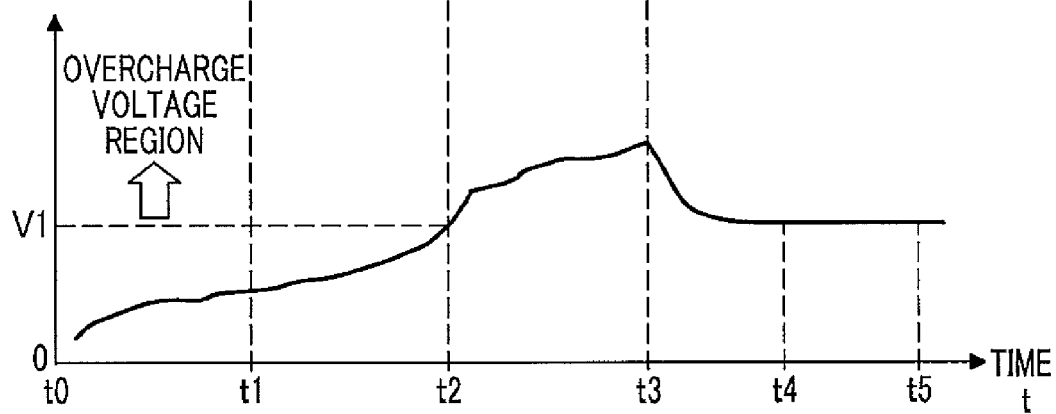
FIG. 2B is a chart showing variation of a charging voltage after start of charging according to the embodiment of the present invention.
Figure 3:
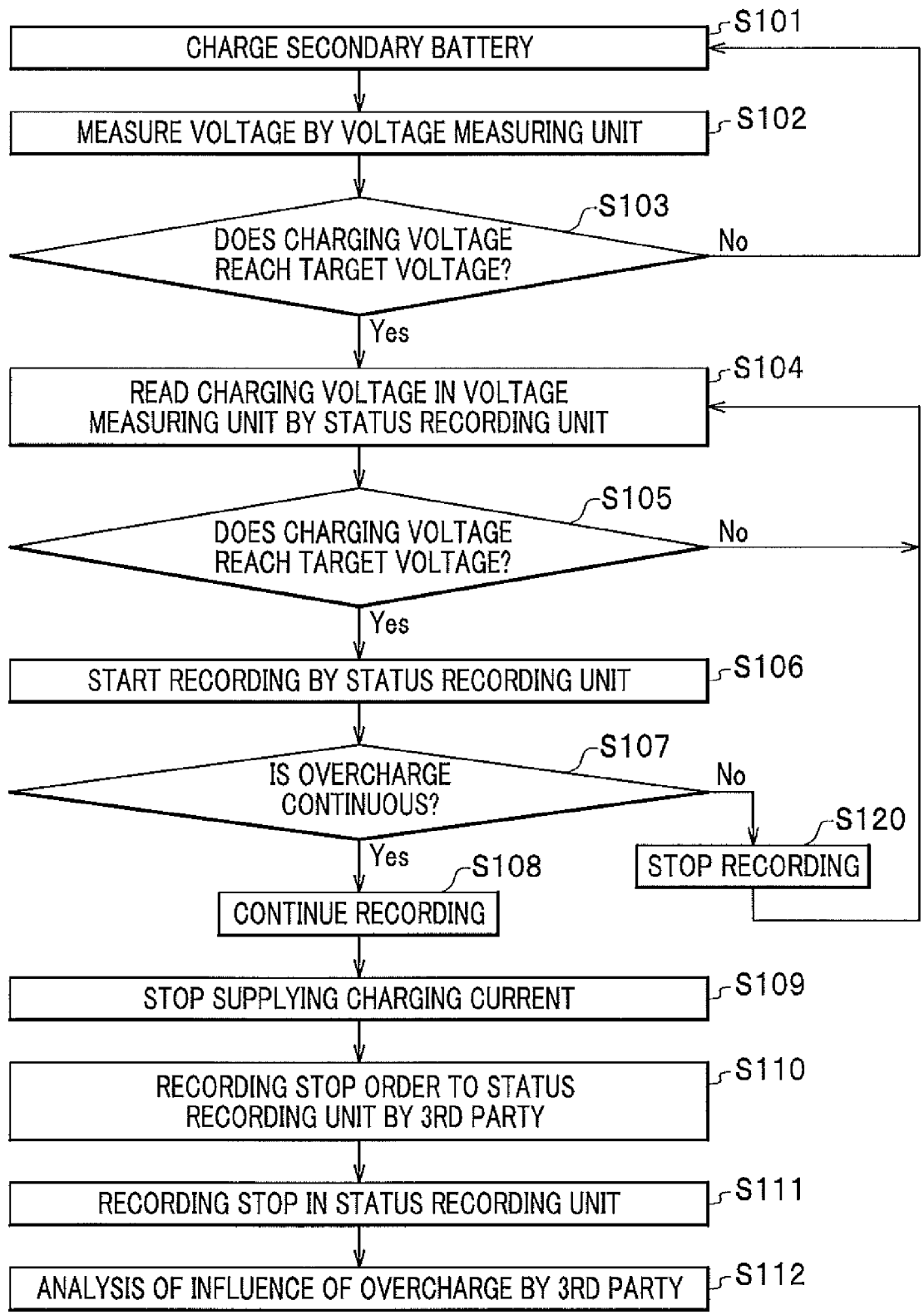
FIG. 3 is a flowchart of a control operation of charging in the charging control system according to the embodiment of the present invention.

With reference to FIGS. 2A, 2B, and 3, will be described a method of controlling charging in the charging control system 10 according to the embodiment. FIGS. 2A and 2B are charts of the charging current and the charging voltage with respect to time after start of charging the secondary battery 1. FIG. 3 is a flowchart of a control operation of charging in the charging control system according to the embodiment of the present invention. In the description below, as far as not specified otherwise, "time" which is simply described means "time" shown in FIGS. 2A and 2B, and "step" which is simply described means "step" shown in FIG. 3.

In the embodiment, a charging control method in the charging control system 10 according to the embodiment will be described with exemplification of a case where the charging voltage value for the secondary battery 1 is not smaller than the target voltage value due to no control of charging the secondary battery 1 because the battery protecting unit 5 and the current control unit 6a included in the charging unit 6 do not normally operate.

<Time t0 to t2: Charging Secondary Battery in Region where Charging Voltage not Larger than Target Voltage Value V1>

After start of charging, at an initial stage of charging, the constant current charging is performed (see FIG. 2A). As charge of the secondary battery 1 proceeds, the charging voltage value of the secondary battery 1 increases (see time t0 to t1). The charging voltage value during charging is continuously measured by the voltage measuring unit 2 (step S102), and charging is being performed until the charging voltage value of the secondary battery 1 reaches the target voltage value V1 (a route from "No" in step S103). In the description below, a voltage region where charging voltage exceeds a target voltage value V1 is referred to as an overcharging voltage region.

The status recording unit 4 also refers (reads out) the charging voltage value and the charging current value when the charging voltage value is not larger than the target voltage value V1. However, in the flowchart shown in FIG. 3, such a step of referring data is not shown because the charging data is not recorded on the recording unit 41.

<Time t1: Occurrence of Trouble in Current Control Unit>

It is assumed that a trouble occurs in the current control unit 6a in the charging unit 6 at time t1. Accordingly, the CC-CV charging for the secondary battery 1 is not performed and the secondary battery 1 is kept to be charged with a charging current of which value is the same as that in the initial stage of charging. As a result, the charging voltage value of the secondary battery 1 keeps increasing (see time t1 to t2 in FIG. 2B) and reaches the overcharging voltage region where the charging voltage exceeds the target voltage value V1 (see a route from "Yes" in step S103).

<Time t2: Trouble Occurrence in Battery Protecting Unit and Start of Recording Charging Data by Status Recording Unit>

Originally, the charging should be safely stopped as far as the battery protecting unit 5 normally operates though a trouble occurs in the current control unit at time t1. However, in the embodiment, it is assumed that the charging cannot be stopped until the charging voltage value reaches the target voltage value V1 because a trouble occurs also in the battery protecting unit 5, so that the charging voltage will exceed the target voltage value V1 (see a part around time t2 in FIG. 2B). When referring the charging voltage value (step S104) and detecting that the referred charging voltage value is greater than the target voltage value V1 (a route from "Yes" in the step S105), the status recording unit 4 records the charging data on the recording unit 41 as the recorded charging data (step S106). When the referred charging voltage value is not greater than the target voltage value V1, the status recording unit 4 repeats referring (a route from "No" in the step S105).

Here, when the status recording unit 4 can determine that the overcharging is continuous (the status from time t2 to time t3 in FIG. 2B), the status recording unit 4 keeps recording the charging data (a route from Yes in the step S107 and step S108). However, when determining the status as a temporarily overcharging, i.e., a status that the charging voltage value temporarily reaches the overcharging voltage region, the status recording unit 4 determines the that the secondarily battery 1 is not in the overcharging status and stop recording the charging data in a step S120.

The determination whether the status is "continuous overcharging" or "temporary overcharging" can be made according to the following basses. More specifically, the determination can be made from continuity of the overcharging status obtained from the recorded charging voltage values, the recorded charging current values, and charging data are arranged based on the recorded referring time in time base.

More specifically, it is preferable to determine the status as a continuous overcharging when at least one of (1) to (3) is established.
(1) A case where the recorded charging voltage value is 1.1 times the target voltage V1.
(2) A case where the recorded charging voltage value is greater than the target voltage value V1 and the recorded charging current is not smaller than 0.05 C when the recorded voltage value is not greater than a value which is 1.1 times the target voltage V1. Regarding "C", "1 C" is defined as a current value when a secondary battery in a fully charged status (SOC100%) is discharged to a perfectly discharged status (SOC0%) for one hour. "C" in the description below has the same definition.
(3) A case where the recorded charging current value greater than the target voltage value V1 continues for five or more seconds. "Five or more seconds" corresponds to, for example, the case where this status continues ten times when a recording interval is 0.5 seconds or the case where this status continues five times when the recording interval is one second.

More specifically, it is preferable that the status recording unit 4 stops recording on the recording unit 41 on the basis of at least one kind of the recorded charging data. Particularly, when the status recording unit 4 stops recording in consideration of all the recorded charging data (for example, the case of (3)), it is possible to conduct the charging control with a higher accuracy because the determination between the continuous overcharging and the temporary overcharging can be more accurately provided. On the other hand, when the status recording unit 4 stops recording through consideration of only one kind of recorded charging data, for example, in the case of (1), this judgment is simple because only one kind of data is considered when a determination is made whether the battery can be re-used. Accordingly, this allows, for example, a program for determining the re-use to be simple.

In a step S107, when the overcharging is determined not to be continuous (a route of "No" in the step S107), the recording the charging data on the recording unit 41 is stopped, and then the status recording unit 4 refers the charging voltage value (step S104). When the charging voltage value is not greater than the target voltage value V1, the referring operation is repeated (a route of "No" in the step S105). When the status recording unit 4 detects that the referred charging voltage value is greater than the target voltage value V1, the status recording unit 4 starts recording the charging data on the recording unit 41 again (step S106).

<Time t3: Settlement of Trouble in Battery Protecting Unit and Stop Charging>

When the function of the battery protecting unit 5 is restored, charging current to the secondary battery 1 is forcibly cut off at time t3. Accordingly, supplying the charging current from the charging unit 6 to the secondary battery 1 is stopped (step S109), and increase in the charging voltage to the secondary battery 1 is stopped (see time t3 to t4 in FIG. 2B). When the battery protecting unit 5 in the trouble is not restored, a self-overcharging protection function generally provided in the secondary battery 1 will cause disconnection in an internal circuit of the secondary battery 1, which stops charging safely. However, the secondary battery having a once disconnected line cannot be re-used.

<Time t4: Recording Stop Order and Stop of Recording Charging Data by Battery Manager>

After stop of supplying the charging current 1, a third party transmits a recording stop order of recording the charging data to the status recording unit 4 (step S110). A method of transmitting the stop order of recording is arbitrary. For example, recording can be stopped by pressing a button for stopping of recording by the status recording unit 4. This operation stops recording the charging data by the status recording unit 4 (step S111). In addition, though the recording stop order is not transmitted by the third party, recording by the status recording unit 4 can be stopped, for example, when the referred voltage value is not greater than the target voltage value V1 for a predetermined time period. On the other hand, when the overcharging status is continuous for a predetermined time period, or when the charging current not smaller a predetermined current quantity is supplied, it is extremely difficult to re-use the secondary battery 1. Because there is no necessity to estimate influence of the overcharging (described later), a program for automatically stop recording in response to detection of such a case can be provided in the status recording unit 4.

<Time t5: Conversion of Influence on Overcharging to Secondary Battery>

The third party can estimate an influence of the overcharging on the secondary battery 1 can be estimated (analysis) on the basis of the recorded charging data (step S112). There is no specific limitation in a method of estimating the influence. However, the influence can be estimated on the basis of an integration value (hatched part in FIG. 2A) obtained by integrating the charging current value at the target voltage value for the time period while the overcharging occurs with the charging current value on the basis of the recorded charging information. The obtained value can be an index for determining whether the secondary battery 1 can be further usable.

A correlation between the integration value and an extent of the overcharging to the secondary battery 1 cannot be necessarily defined because it is preferable to generally determine the correlation in consideration of, for example, a material used for the positive electrode, components and contents of the nonaqueous electrolyte, and a utilization factor of the positive electrode active materials. For example, a secondary battery containing $LiFePO_4$ as the positive electrode active material and EC, EMC, and DMC as components of the nonaqueous electrolyte is charged by a current corresponding to 1 C for more than 0.3 hours at the charging voltage of 5.2 V, damage on the secondary battery is as large as no one can neglect the damage. Accordingly, it is difficult to re-use the secondary battery after the overcharging. More specifically, a threshold of the integration value for determining whether the secondary battery is re-usable is $\int I \, d=0.3$ (an area of the hatched part in FIG. 2A is 0.3).

In addition, generally the influence can be determined such that the greater the integration value is, the greater the influence of the overcharging to the secondary battery 1 becomes. On the other hand, the smaller the integration value is, the smaller the influence of the overcharging to the secondary battery 1 becomes.

As a unit of calculating the integration value, the charging data recorded on the recording unit 41 which is configured to be detachable is taken into a PC (Personal Computer) or the like which calculate the integration value. However, from point of view to more easily estimate the influence of the overcharging to the secondary battery 1, it is preferable that the charging control system 10 according to the embodiment have the program for conducting the calculation above and a determining unit 42 for determining whether the secondary battery 1 after the overcharging is usable or not on the basis of the value calculated by the program. In addition, it is preferable to display the result determined by the determining unit on a display 43, for example, a liquid crystal display (not shown). A format of the display is arbitrary such that the calculated value itself is displayed or one of marks different from each other in accordance with the value is displayed. In a case where a lamp or an LED is used as the display, for example, a red light signal is turned on when the re-use is impossible, a yellow light signal is turned on when re-use is allowed two or three times, and a green light signal is turned on when a general re-use is allowed.

As described above, in the charging control system 10 according to the embodiment, the record of the charging data is done in response to, as a trigger of start of recording, detection that the charging voltage value exceeds the target voltage value V1. The recording the charging data is continued at every predetermined time interval and stopped when the third party transmits the recording stop order to the status recording unit 4. The charging data recorded on the recording unit 41 can be referred by the third party after and before the third party transmits the recording stop order.

The invention claimed is:

1. A charging control system for recording data regarding charging a secondary battery, comprising:
    a recording unit configured to store the data;
    a voltage measuring unit configured to measure a charging voltage value of the secondary battery;
    a current measuring unit configured to measure a charging current value of the secondary battery;
    a status recording unit configured to refer the charging voltage value and the charging current value and to record the referred charging voltage value, the referred charging current value, a first reference time when the charging voltage value is referred and a second reference time when the charging current value is referred, on the recording unit; and
    a battery protecting unit configured to stop the charging of the secondary battery when the charging voltage exceeds a predetermined target voltage value, wherein the status recording unit starts recording of the charging voltage value, the charging current value, and the first and second reference times on the recording unit, when the charging voltage exceeds a target voltage value as a result of a failure in stopping charging by the battery protecting unit because of occurrence of trouble in the battery protecting unit, and
    wherein the status recording unit is configured to record the referred charging voltage value as a recorded charging voltage value, the referred charging current value as a recorded charging current value and the first reference time to which the charging voltage value is referred and the second reference time to which the charging current value is referred as recorded first and second reference times, and wherein
    the status recording unit is configured to stop the recording on the recording unit on the basis of values of at least one of the recorded charging voltage value, the recorded charging current value and the recorded first and second reference times after the status recording unit started the recording of the charging voltage, the charging current value, and the first and second reference time on the recording unit.

2. The charging control system as claimed in claim 1, wherein, after the status recording unit stops the recording of the charging voltage value, the charging current value, and the first and second reference times, the status recording unit starts again the recording of the charging voltage value, the charging current value, and the first and second reference times on the recording unit when the status recording unit detects that the charging voltage value exceeds the target voltage.

3. The charging control system as claimed in claim 1, wherein the charging voltage value, the charging current value, and the first and second reference times are recorded on the recording unit so that the charging voltage value, the charging current value, and the first and second reference times are readable by a third party.

4. The charging control system as claimed in claim 1, wherein the recording unit is configured to be detachable.

5. The charging control system as claimed in claim 1, further comprising a determining unit and a display unit, wherein
    the status recording unit is configured to record the referred charging voltage value as a recorded charging voltage value, the referred charging current value as a recorded charging current value and the first reference time to which the charging voltage value is referred and the second reference time to which the charging current value is referred as recorded reference first and second times, and wherein
    the determining unit is configured to determine whether the secondary battery is re-usable on the basis of the recorded charging voltage, the recorded charging current, and the recorded first and second reference times and display a result of of the determination by the determining unit on the display unit.

* * * * *